Aug. 31, 1954 F. J. SIMON Re. 23,862

APPARATUS FOR FUEL INJECTION

Original Filed April 7, 1949 3 Sheets-Sheet 1

Inventor

Ferdinand J. Simon

By Paul O. Pippel

Attorney

APPARATUS FOR FUEL INJECTION

Original Filed April 7, 1949 3 Sheets-Sheet 2

Inventor

Ferdinand J. Simon

By Paul O. Pippel

Attorney

APPARATUS FOR FUEL INJECTION

Original Filed April 7, 1949 3 Sheets-Sheet 3

Inventor

Ferdinand J. Simon

By Paul O. Pippel

Attorney

Reissued Aug. 31, 1954

Re. 23,862

UNITED STATES PATENT OFFICE 23,862

APPARATUS FOR FUEL INJECTION

Ferdinand J. Simon, Lutcher, La., assignor to International Harvester Company, Chicago, Ill., a corporation of New Jersey Original No. 2,635,590, dated April 21, 1953, Serial No. 85,979, April 7, 1949. Application for reissue May 10, 1954, Serial No. 428,859

11 Claims. (Cl. 123—32)

Matter enclosed in heavy brackets [ ] appears in the original patent but forms no part of this reissue specification; matter printed in italics indicates the additions made by reissue.

This invention comprises novel and useful improvements in a method and apparatus for fuel injection and more specifically pertains to an improved fuel metering and injection device for internal combustion engines, together with an improved method of metering and injecting fuel therein.

The primary object of this invention is to provide a unitary assembly combining the functions of a metering device and a fuel injector wherein both operations may be performed by the same apparatus, and which may be easily installed in existing internal combustion engines with little or no change in the engine structure, and which enables the charge injected into the engine cylinder to be accurately and easily varied as desired.

A further object of the invention is to provide an apparatus and method which enables the metered charge of fuel to be injected into the engine cylinder to be preheated in the injection device by the temperatures created during the operation of the engine, whereby the charge is preconditioned for most effective employment in the operation of the engine.

A further important object of the invention is to employ the plunger of the injection pump for the dual functions of injecting the fuel charge and for metering the charge to be injected.

And a further important object of the invention is to provide an improved construction of injecting device which shall be simple and easy to manufacture, which will eliminate the necessity for employing separate expensive metering elements; which shall have fewer moving parts than present injection systems; wherein the quantity of fuel injected will be little or not at all affected by variations in engine speed or varying pressures of the supply pump of the fuel system; and wherein there is provided a device having a minimum number of moving parts.

These, together with various ancillary objects and features of the invention which will be later apparent as the following description proceeds, are attained by the present invention, a preferred embodiment of which has been illustrated by way of example of the principles of the invention in the accompanying drawings, wherein.

Figure 6:
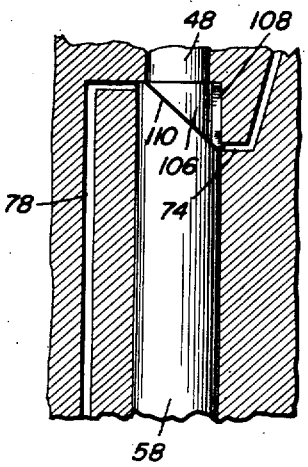
Figure 7:
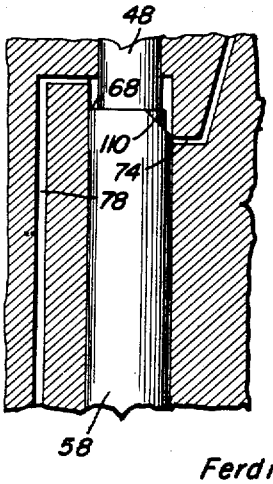
Figure 8:
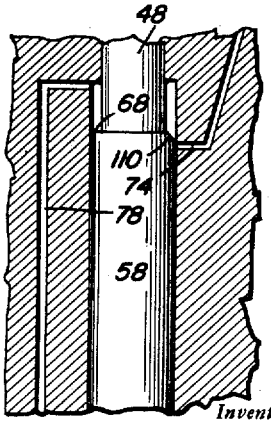
Figure 9:
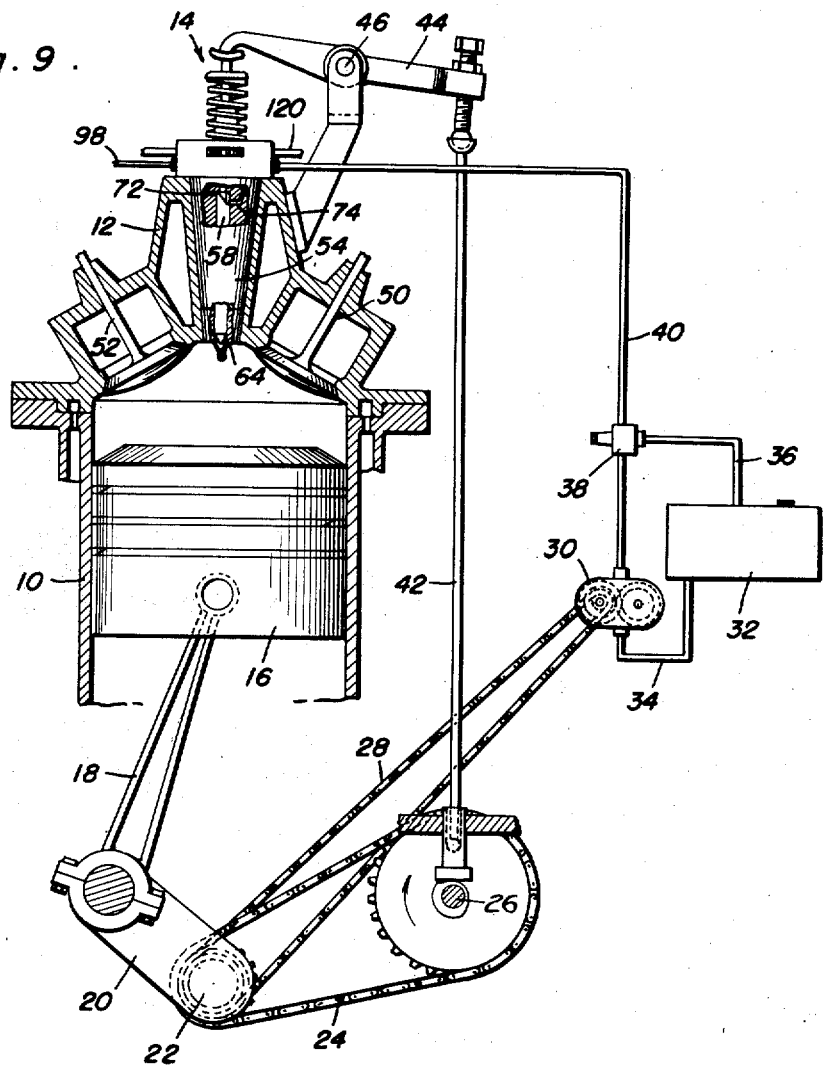

Figures 6–8 are fragmentary vertical central longitudinal sectional views through the upper portion of the plunger and the plunger barrel showing the position of the parts when the plunger has been rotationally adjusted respectively to the "no injection," "partial injection" and "full injection" positions of adjustment; and Figure 9 is a diagrammatic view, parts being broken away and shown in section illustrating an injection system applied to an engine cylinder and showing the relative positions of the engine piston and the plunger as the engine piston approaches the top position in the engine cylinder.

The present apparatus and method is similar to and in many respects is an improvement upon the injection method and system set forth in the prior patents of Cummins, Patent No. 1,752,786, of April 1, 1930, and No. 1,561,913 of November 17, 1925.

The above mentioned Cummins patents relate to an open cup injection nozzle of a well known type of injection system, which open cup injection nozzle possesses the very great advantage that the fuel which is to be injected as the fuel charge of the engine cylinder is placed and retained in the open cup prior to the injection stroke of the plunger, whereby the charge will be preheated and, to some extent, vaporized by the heat of operation of the engine as communicated to the injector unit and injection nozzle disposed in the engine cylinder.

However, in the Cummins' engine and in various other engines operating upon the same general method, it has been heretofore necessary to provide a separate fuel metering device for supplying and preparing fuel charges to be supplied to the fuel injector chamber, in varying sizes in accordance with varying conditions of operation of the engine. The present invention combines the functions of a metering device and of a fuel injector in a unitary assembly wherein the injection plunger is employed for the dual functions of metering a charge and delivering the same to the open cup nozzle where the same may be preheated in the manner set forth in the above mentioned Cummins' patent, and thereafter simultaneously injects this meter charge into the engine cylinder while refilling the fuel pump chamber of the metering arrangement. The present invention further provides for varying or adjusting the metered charge by expelling a portion of the contents of the fuel chamber during the first portion of the upward stroke of the plunger, by means of an axially and circumferentially extending recess in the upper portion of the plunger which registers with the port through which the fuel is supplied from a source of fuel under low pressure, and thereafter discontinuing this registration and expulsion of the fuel and delivering the intrapped remainder as the metered charge to the injection nozzle. Additionally, means is provided in the present invention for rotating the plunger in order to vary the duration of the registration of the fuel expelling recess with the inlet port.

Referring now more specifically to the accompanying drawings, wherein like numerals designate similar parts throughout the various views, attention is directed first to the diagrammatic view of Figure 9, wherein the numeral 10 designates a cylinder of an internal combustion engine having a cylinder head 12 which may be integrally or detachably united with the cylinder 10, and in which is mounted a unitary fuel metering and injecting device indicated generally by the numeral 14.

Reciprocable in the cylinder 10 is a piston 16 which is connected by a connecting rod 18 to a crank throw 20 of the crank shaft 22 which, in turn, drives in any suitable manner, such as that indicated at 24, a timing shaft 26 which may constitute a cam shaft and by means of which the injecting device 14 is actuated in timed relation to movements of the piston 16.

Likewise operated as by a driving connection 28 which is connected with the crank shaft 22 is a fuel supply pump 30 of any suitable construction for delivering fuel under the relatively low pressure of ten to twenty pounds to the injecting device 14. A fuel tank 32 is connected to the intake side of the fuel pump 30 as by a conduit 34, and a return line 36 connects the tank to adjustable pressure release valve 38 which is included in the fuel supply conduit 40 connecting the pump 30 with the injecting device 14. This arrangement is such that with the relief valve 38 being set for from ten to twenty pounds, the selective pressure is maintained in the supply line 40, any excess fluid being returned by the return line 36 to the tank 32. Thus, there is insured a continuous supply of low pressure fuel from the pump 30 through the delivery conduit 40 to the fuel injecting device 14.

Figure 1:
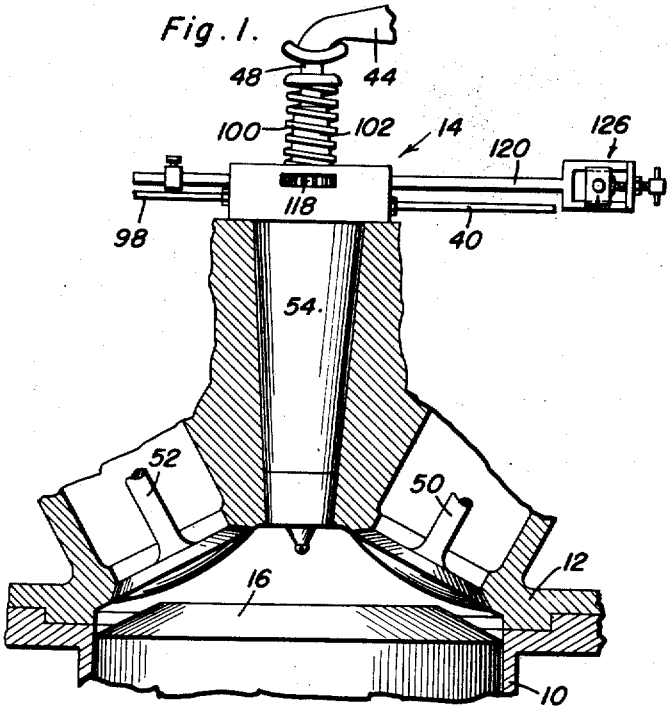
Figure 1 is a vertical sectional view through a portion of an engine cylinder and head showing the mounting of the novel injector forming the subject of this invention in the head.
Figure 5:
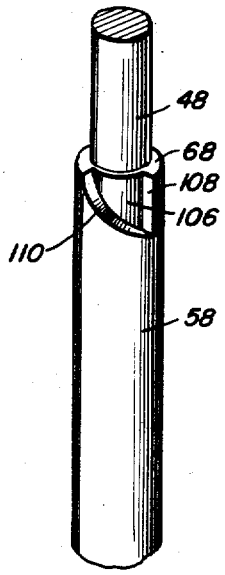
Figure 5 is a perspective view of a portion of the plunger of the injector.

Suitable cams on the cam shaft 26 reciprocate an operating rod 42 to, in turn, oscillate a rocker 44, journaled as at 46, which rocker, as will be also apparent from Figure 1, serves to depress the upper extremity of the reduced portion 48 of the injection plunger.

The cylinder head, as also shown in Figure 1, is provided with a pair of valves 50 and 52 which may respectively constitute the air inlet and exhaust discharge valves of the engine, these valves being operated by any suitable mechanism from the engine cam shaft 26.

It should be here noted that although not limited thereto, the principles of this invention are particularly adapted to the well known four-cycle diesel or fuel injection engines.

Figure 2:
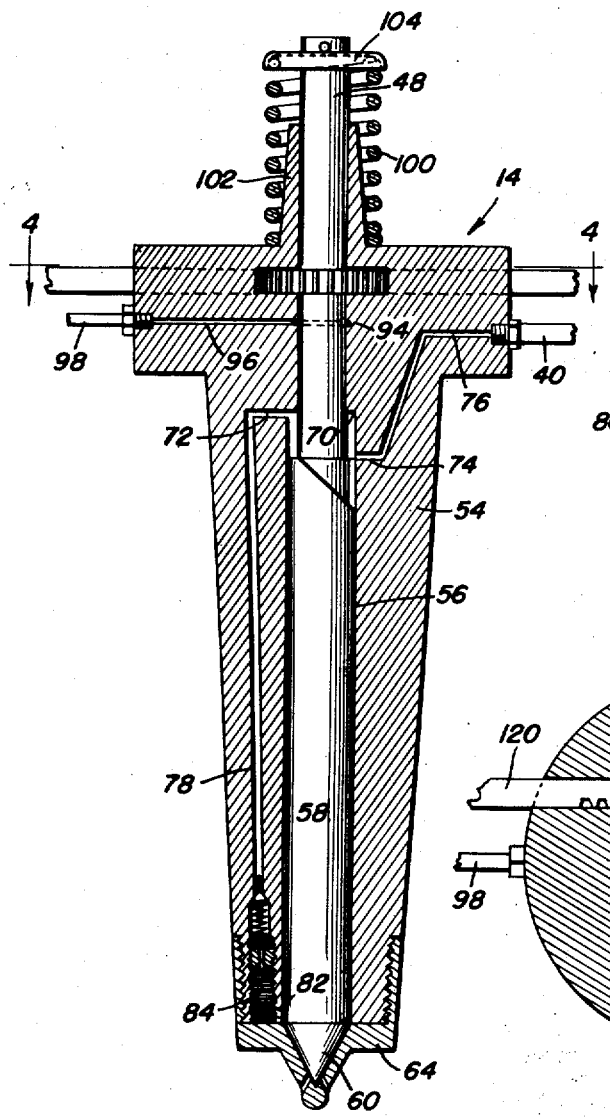
Figure 2 is a vertical central longitudinal view through the novel injector forming the subject of this invention, the parts being shown in the position which they assume at the termination of the period of injection.
Figure 3:
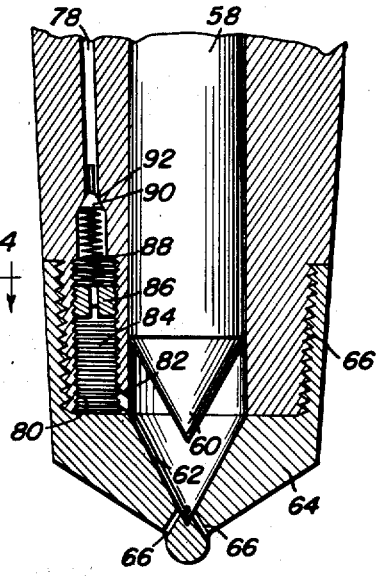
Figure 3 is a fragmentary view of the lower portion of Figure 2, showing the position of the parts when the plunger is at its upper position.

Referring now more specifically to Figure 2 for an understanding of the construction of the unitary fuel metering and injecting device, it will be seen that the latter includes a body portion 54 which may be of generally frusto-conical shape for attachment in a suitable aperture in the cylinder head in any desired manner, which body constitutes a pump valve and is provided with an axially and longitudinally extending bore 56 constituting a chamber in which is reciprocatingly received the diametrically enlarged lower portion 58 of the injection plunger, whose lower extremity has a conical portion as shown at 60 for registration with and cooperation with a similarly shaped conical inner surface 62 formed in a cap 64 which is internally screw-threaded, as at 66, to the open lower end of the barrel 54. The cap 64 and the conical interior surface 62 thereof thus constitute an open cup injection nozzle, provided with injection orifices 66, as also shown in Figure 3.

As will be apparent from Figures 2 and 5–8, the plunger consists of upper and lower cylindrical portions 48 and 58 of different diameters, that of the lower portion being greater than the upper portion, which portions are joined by an annular horizontal shoulder 68 which functions as a pump piston. The large diameter 58 reciprocates in the bore 56, while the reduced diametered portion 48 extends through the upper end of the injection device and also into the barrel bore 56. The horizontal shouldered portion 68 thus cooperates with the inner extremity 70 of the bore 56 to define therewith a fuel pump chamber having at its upper end a fuel delivery or discharge port 72, and spaced from the wall 70, a fuel inlet port 74 which is connected by conduits 76 with the previously mentioned fuel supply conduit 40.

The fuel discharge port 72 is connected by a longitudinally extending passage 78 with an enlarged bore 80 extending inwardly from the bottom end of the barrel 54. As shown more clearly in Figure 3, an outlet port 82 connects the enlarged bore 80 with the interior of the bore 56, and consequently with the interior 60 of the open cup injection nozzle.

This enlarged bore 80 is internally threaded as at 84 for the reception of a retaining plug 86 upon which is seated a compression spring 88 which retains a check valve 90 in seated position upon a valve seat 92 formed at the junction of the passage 78 and the enlarged bore 88.

Above the wall 70 of the bore 56, the body of the injection device is provided with an internal groove 94 which surrounds the reduced portion 48 of the plunger, and is connected by a passage 96 with a drain conduit 98. This construction permits the trapping of any fuel passing upwardly along the reduced portion 48, and returning the same by the conduit 98 to the fuel tank 32.

As so far described, it will be seen that upon the downstroke of the plunger, fuel from the low pressure pump 30 will be supplied to the fuel pump chamber within the bore 56 above the upper end of the shoulder 68, to thereby fill this chamber as well as the passages 72 and 78. During this downstroke of the plunger, fuel will not pass the check valve 90, since the latter is retained upon its seat by the operating or injecting pressure below the conical tip 60 of the plunger, as well as by the pressures prevailing within the cylinder of the engine, which will all greatly exceed the pressure of the fuel supply.

The plunger is normally urged to its upper position as by means of a compression spring 100 which is seated upon the upper portion of the injected body, and may conveniently surround the integral conical guide bushing 102 formed upon the body and which surrounds the upper portion 48 of the plunger. The other extremity of the compression spring bears against a spring retainer 104 fixedly secured to the plunger portion 48.

Referring again to Figure 5, it will be seen that the upper portion of the diametrically enlarged portion 58 of the plunger is provided with a recess in its upper exterior surface, as indicated by the numeral 106. This recess, which opens downwardly from the annular shoulder 68, comprises a longitudinally extending wall 108, which at its lower end intersects a circumferentially and an axially curved and extending wall 110. The two walls thus define a substantially wedge-shaped recess which is of progressively varying axial length. This recess is adapted for registration with the inlet port 74, so that when the unrecessed portion of the plunger 58 covers the port 74, the communication of the fuel pump chamber with the source of fuel supply will be cut off; while, when the recess is in registration with the port 74, communication is had between the fuel pump chamber and the source of supply.

Figure 4:
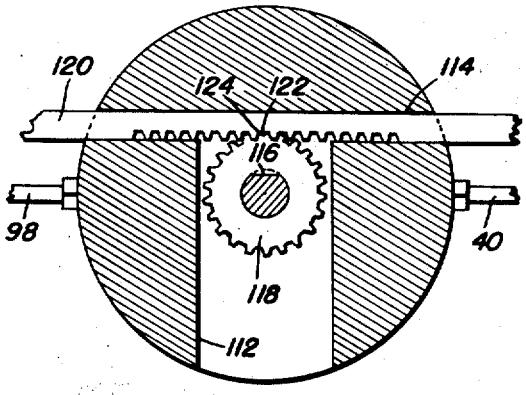
Figure 4 is a horizontal sectional view taken substantially upon the plane of the section line 4—4 of Figure 2.

It will be evident that as the plunger is rotated, a registration of the port 74 with the interior of the fuel pump chamber of varying duration will be effected. For this purpose, as shown in Figure 4, the injector body is provided with a radial bore or slot 112 which is intersected by a cross slot 114. The reduced portion 48 is provided with a flat surface 116, extending about two-thirds of the length thereof, by means of which an adjustment pinion 118 is keyed to the portion 48 for non-rotational but longitudinal sliding movement relative thereto. A rack bar 120 is slidably received in the passage 114 for registration with the pinion 118 for rotating the latter.

The open bore 112 permits the insertion or withdrawal of the pinion gear 118 therefrom while the rack bar 120 is in place, with the plunger being inserted or withdrawn endwise from the bore 56 into or from the pinion 118.

Preferably, the rack bar 120 is provided with an enlarged space 122 between two of its teeth for receiving a corresponding enlarged pinion tooth 124 whereby the rack and the pinion, and consequently the rotational position of the injection plunger, may be readily timed and adjusted.

As shown in Figure 1, the rack bar 120 may be provided at one extremity with any suitable adjustable connecting means indicated generally at 126 by means of which the rack bar may be reciprocated either by means of an automatic governor, in accordance with speed changes of the engine, by manual means or the like.

From the foregoing, the operation of the device will now be understood. When the rack bar has been operated to rotationally adjust the plunger until the latter assumes the position indicated in Figure 6, it will be seen that the recess 106, and consequently the interior of the fuel pump chamber, remains at all times in registry with the inlet port 74. Consequently, during the upward stroke of the plunger, the upwardly moving horizontal shoulder 68 which constitutes the fuel pump piston will expel the entire contents of the fuel pump chamber backwardly through the conduit 74 and into the fuel tank 32, or to the source of fuel supply. Therefore, since the entire contents of the fuel pump chamber have been rejected, against the relatively low pressure of the supply system, none of the contents have been forced through the passages 72 and 78 past the check valve 90, since the latter is retained seated by pressures in the engine cylinder which are greatly in excess of the ten to twenty pounds pressure of the fuel supply system. Consequently, the injector is inoperative during this rotational setting of the plunger. Conversely, when the injector plunger is rotated to the position shown in Figure 8, so that substantially none of the recess 106 is registered with the inlet port 74 during the reciprocation of the plunger, it will be seen that substantially none of the contents of the fuel pump chamber have been expelled or returned through the fuel delivery line, so that substantially the entire contents of the fuel chamber are trapped by the rising plunger and are delivered through the conduits 72 and 78, under the pressure of the plunger spring 100, forced past the check valve 90 and delivered through the discharge port 82 into the injection chamber of the open cup injector.

It will be further apparent that as shown in Figure 7, with the plunger rotationally adjusted between the extremes of Figures 6 and 8, that varying portions of the wall 110 will be registered with the inlet port to thereby vary the duration of registration, and consequently the quantity of charge rejected from the fuel pump chamber and expelled through the inlet port 74. After the edge or shoulder 110 is past the inlet port, the remainder of the charge in the fuel pump chamber is trapped, and thus constitutes the metered charge which is then injected as above mentioned.

In the preferred method of operating this invention, the plunger of the injector is so timed relative to the reciprocation of the engine piston that substantially at the beginning of the downward power stroke of the engine piston, the cam shaft 26 actuates the rocker 44 to cause the downward stroke of the plunger against the spring 100, whereby the fuel charge retained in the open cup of the injection nozzle is injected into the engine cylinder. At the same time, upon its downward stroke, the annular piston surface 68 in the fuel pump chamber, in moving downward with respect to the wall 70, expands the fuel pump chamber so that the source of fuel pressure, the pump 30 and conduit 40 may replenish and fill the fuel pump chamber to its fullest extent. Figure 2 discloses the plunger in its lowermost position, after the completion of the injection stroke of the plunger. The plunger remains in its lowered position during the exhaust stroke but at the beginning of the intake stroke, the rocker 44 is released and the spring 100 then raises the plunger to its uppermost position, as shown in Figure 9, Figure 3, and Figure 6. As the plunger moves upwardly, the piston-like annular shoulder 68 begins to compress the fluid in the fuel pump chamber, and if the recess 106 is in registration with the port 74, expels fluid from the pump chamber back through the inlet port and to the source of fuel supply. This expulsion of fluid continues until the wall 110 overruns the port 74, whereupon communication of the fuel pump chamber with the source of supply is cut off, the expulsion of fuel ceases, the charge remaining in the fuel pump chamber, which is the metered charge, is delivered into the injection chamber.

The injection plunger remains in its raised position throughout the rest of the intake stroke, and the compression stroke of the engine piston. During this time, it will be seen that the metered charge which has been forced into the injection chamber is there preheated, and to some extent gasified by the heat absorbed by the injection device from the high temperature prevailing in the working chamber of the engine. Thus, the metered charge is thus conditioned for most effective utilization on the ensuing injection stroke of the device.

In summary, it will be seen that this method and apparatus thus rejects a portion of the charge and therefore meters the charge on the upstroke of the plunger and delivers this metered charge to the open cup injector nozzle where the same is preheated, all this being performed during the intake stroke of the engine piston. Rotation of the reciprocable plunger of the injector serves to readily control and accurately regulate or meter individual fuel charges to be supplied to the cylinder. Upon the downstroke, the plunger both injects this metered and preheated charge, and replenishes the fuel chamber in readiness for the next metering operation.

From the foregoing, the construction and operation of the device will be readily understood and further explanation is believed to be unnecessary. However, since numerous changes will readily occur to those skilled in the art after a consideration of the foregoing specification and accompanying drawings, it is not desired to limit the invention to the exact construction shown and described. Accordingly, all suitable modifications and equivalents may be resorted to, falling within the scope of the appended claims.

Having thus disclosed and described the invention, what is claimed as new is as follows:

1. A fuel injection device comprising a pump barrel, a plunger in said barrel, an open cup injection nozzle at one end of said plunger and barrel forming an injection chamber, a fuel pump chamber at the other end of said plunger and barrel, inlet and outlet means respectively connecting said pump chamber with a source of low pressure fuel and with said injection chamber, means for moving said plunger towards said nozzle to effect fuel injection and metering means *including an element movable with said plunger and* operative upon movement of said plunger from said nozzle for *variably* metering a charge of fuel in said pump chamber and delivering said charge through said outlet means to said injection chamber, a non-return valve in said outlet means for preventing return flow from said injection chamber to said pump chamber.

2. A unitary fuel metering and injection device for internal combustion engines comprising a pump barrel having a plunger reciprocable therein, a fuel pump chamber in said barrel receiving the upper end of said plunger, an injection chamber including an open cup injection nozzle in said barrel receiving the lower end of said plunger, inlet means including a port in said pump chamber for supplying low pressure fuel to said chamber, conduit means connecting said pump chamber to said injection chamber, *variable* metering means associated with the upper end of said plunger for expelling a portion of the charge in the pump chamber to said inlet means and for discharging the remainder to said injection chamber upon the upstroke of said plunger, a non-return valve in said conduit means for preventing return flow from said injection chamber to said pump chamber.

3. The combination of claim 2 including means to rotate the plunger to vary the quantity of the portion which is expelled by said metering means.

4. The combination of claim 2 wherein said metering means includes a circumferentially and axially extending recess of the upper end of said plunger constantly communicating with said pump chamber and registerable with said port, means to rotate the plunger to vary the duration of registry of said recess with said port during the upward stroke of the plunger for controlling the quantity of the portion which is expelled by said metering means.

5. The combination of claim 2 wherein said plunger has portions of different diameters separated by a shoulder, said shoulder cooperating with the walls of the fuel chamber to define a fuel pump piston.

6. In an apparatus for injecting fuel into internal combustion engines of the four cycle type having a cylinder with a piston reciprocable therein and an injection device having a pump chamber with a plunger therein, an injection chamber and an open cup injection nozzle disposed in said cylinder; means for causing an up-stroke of the plunger during the intake stroke of the piston, means *including an element movable with the plunger* for providing a *selectively* predetermined charge of fuel in the pump chamber during the first portion of the plunger upstroke and means during the latter portion thereof for discharging the metered charge into the open cup injection nozzle, means for maintaining the plunger in its upper position until *substantially at the beginning of* the piston working stroke, means *thereupon* causing a downstroke of the plunger [during the working stroke of the piston] and thereby [inject] ejecting the charge in the injection nozzle *for effecting the working stroke of the piston,* means for filling said pump chamber with a fresh charge, said filling means and said means for causing a downstroke of the plunger being operable simultaneously.

7. The combination of claim 6, wherein said means for providing [a] *the selectively* predetermined charge of fuel in the pump chamber includes means for rejecting a portion of the contents of the fuel chamber and means for regulating said last means to vary the quantity of the rejected portion.

*8. A fuel injection device comprising a pump barrel, a plunger in said barrel, an open cup injection nozzle at one end of said plunger and barrel and including an injection chamber, a fuel pump chamber at the other end of said plunger and barrel, transfer channel means communicative between the fuel pump chamber and said injection chamber, port means for admitting fuel into the pump chamber and for ejecting fuel from such chamber, means for moving the plunger endwise alternately toward said nozzle and away from said nozzle, the plunger being operable attendant to movement toward said nozzle to effect ejection of fuel from the injection chamber through said nozzle while expanding the pump chamber to load fuel therein through the port means, and variable metering means comprising means operating during a selectable span of an ensuing movement of the plunger away from said nozzle to block ejection of the fuel load from the pump chamber through said port means to cause concurrent pumping of fuel from the pump chamber through the transfer channel means into the injection chamber, and a non-return valve in said transfer channel for preventing return flow*

*from said injection chamber to said pump chamber.*

*9. A fuel injection device comprising a pump barrel, a plunger in said barrel, an open cup injection nozzle at one end of said plunger and barrel and including an injection chamber, a fuel pump chamber in the barrel at the other end of said plunger, a transfer channel communicative between the fuel pump chamber and said injection chamber, a check valve in the transfer channel and including a valve seat and a member seatable thereon in an upstream direction toward the pump chamber to close the valve, port means periodically communicative with the pump chamber for admitting fuel thereto, said port means including at least one port periodically communicative with the pump chamber for accommodating ejection of fuel from such chamber, said plunger being movable toward said nozzle to expand the pump chamber for receiving fuel through said port means during a fuel admission communicative period, said port means being communicative with the pump chamber during an interval of ensuing movement of the plunger from the injection chamber toward the pump chamber to accommodate ejection of fuel from such chamber to prevent the fuel therein exceeding a maximum unit pressure, means for yieldably urging the seatable valve member upon the check valve seat with a force requiring a unit pressure of fuel in the transfer channel and in the pump chamber in excess of said maximum unit pressure to open the check valve, wherefore part of the fuel received in the pump chamber is ejected through the port means during such interval of ensuing plunger movement, variable metering means comprising means operating during a selectively variable different interval of said ensuing movement of the plunger away from said nozzle to block ejection of fuel from the pump chamber through said port means to increase the unit pressure in the pump chamber to an amount in excess of said maximum unit pressure to open the check valve and cause concurrent pumping of a metered quantity of fuel from the pump chamber through the transfer channel into the injection chamber, and means for moving said plunger toward said nozzle to expand the pump chamber as aforesaid attendant to ejecting the metered transferred fuel from the injection chamber outwardly from said nozzle.*

*10. The combination set forth in claim 8, wherein the volumetric displacement rate of the fuel pump chamber during the selectable span of plunger movement away from said nozzle to pump fuel into the injection chamber is exceeded by the concurrent volumetric expansion rate of the injection chamber, wherefore the fuel being metered into the injection chamber is inadequate in amount to fill the same.*

*11. In an apparatus for injecting fuel into a combustion chamber of a cylinder in a four cycle type internal combustion engine and in which cylinder there is a piston that is reciprocable; an injection device including a pump chamber with a plunger therein, an injection chamber and an open cup injection nozzle disposed in said combustion chamber, means for causing an up-stroke of the plunger subsequent to an exhaust stroke of the piston and prior to the succeeding working stroke thereof, means comprising means movable with said plunger for providing a selectively predetermined charge of fuel in the pump chamber during a portion of the plunger up-stroke and discharging such predetermined charge from the pump chamber into the open cup injection nozzle attendant to such up-stroke of the plunger, means for maintaining the plunger in its upper position substantially until commencement of said succeeding working stroke, means causing a down-stroke of the plunger substantially at the beginning of said succeeding working stroke of the piston and thereby ejecting the charge from the injection nozzle into the combustion chamber for effecting such succeeding working stroke, and means for filling said pump chamber with a fresh charge of fuel attendant to such down-stroke of the plunger.*

References Cited in the file of this patent or the original patent

UNITED STATES PATENTS

| Number | Name | Date |
|---|---|---|
| 1,208,012 | Riotte | Dec. 12, 1916 |
| 1,596,002 | Cummins | Aug. 17, 1926 |
| 1,687,176 | Olsen | Oct. 9, 1928 |
| 1,981,913 | Fielden | Nov. 27, 1934 |
| 1,982,023 | Ritz | Nov. 27, 1934 |

FOREIGN PATENTS

| Number | Country | Date |
|---|---|---|
| 74,937 | Austria | Nov. 11, 1918 |